United States Patent

[11] 3,630,532

| [72] | Inventors | Henry A. Traub<br>Pacific Palisades;<br>Leslie A. Woodson, Long Beach, both of Calif. |
|---|---|---|
| [21] | Appl. No. | 842,178 |
| [22] | Filed | July 16, 1969 |
| [45] | Patented | Dec. 28, 1971 |
| [73] | Assignee | W. S. Shamban & Co.<br>Los Angeles, Calif. |

[54] HIGH- AND LOW-PRESSURE SEAL ASSEMBLY
3 Claims, 8 Drawing Figs.

[52] U.S. Cl. .................................................. 277/144,
277/178
[51] Int. Cl. ...................................................... F16j 9/06
[50] Field of Search........................................... 277/157,
162, 143, 144, 235, 236, 145, 176, 177, 165

[56] References Cited
FOREIGN PATENTS
| 558,383 | 6/1958 | Canada ...................... | 277/178 |
| 911,564 | 11/1962 | Great Britain................ | 277/144 |

*Primary Examiner*—Robert I. Smith
*Attorney*—Smyth, Roston & Pavitt

ABSTRACT: A seal assembly of the type for forming a seal between relatively movable inner and outer members. The seal assembly includes, in one embodiment, nonelastomeric sealing ring means and an elastomeric sealing ring for urging the nonelastomeric sealing ring means into fluidtight sealing engagement with the two members. The elastomeric sealing ring engages both of the members under low-pressure conditions to thereby provide a low-pressure seal and is movable away from one of the members in response to an increase in pressure.

INVENTORS
HENRY A. TRAUB
LESLIE A. WOODSON

ATTORNEYS

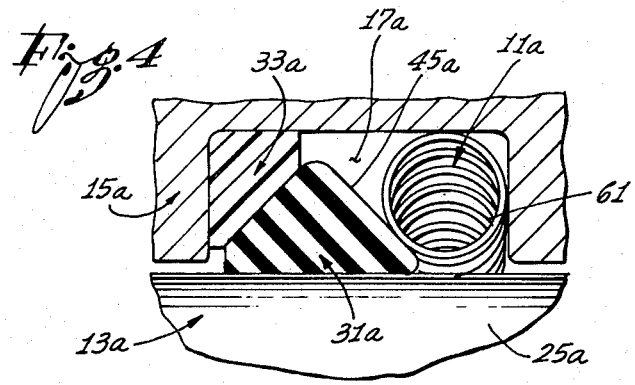
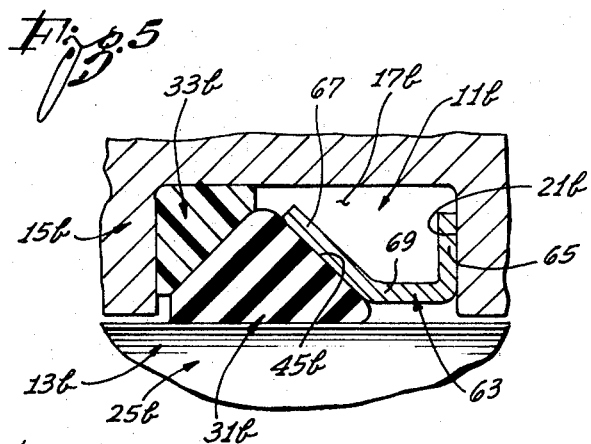
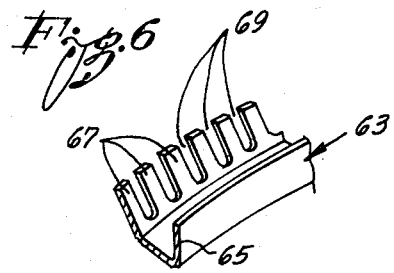
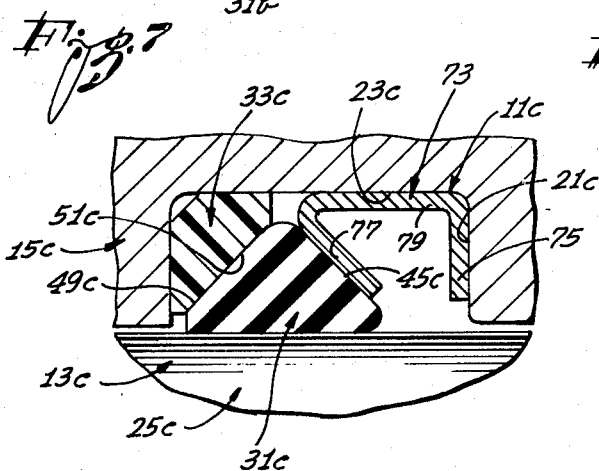
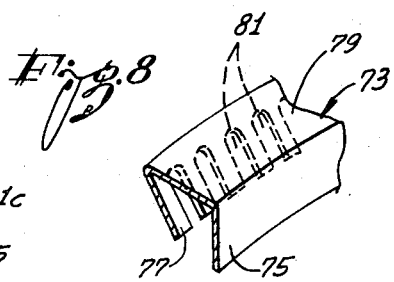

HIGH- AND LOW-PRESSURE SEAL ASSEMBLY

BACKGROUND OF THE INVENTION

This invention relates to a seal assembly of the type employing a camming action to achieve the desired sealing effect. In one prior art seal of this type, two cam elements are provided in combination with a resilient O-ring. The O-ring at all pressures engages both of the relatively movable surfaces between which the seal is to be formed. The problem with this construction is that the O-ring is in continuous contact between relatively movable surfaces and therefore wears rapidly.

Another prior art seal assembly uses cam seals and an O-ring and one of the cam seals forms a slipper seal for the O-ring. This substantially reduces the wear on the O-ring; however, slipper seals are usually constructed of a nonelastomeric material which requires that such seal be urged with substantial force against the sealing surface in order to form a good seal. The slipper seal is dynamically loaded and at low pressures, e.g., under 200 p.s.i., it may not be urged against the sealing surface with sufficient force to form a good seal.

SUMMARY OF THE INVENTION

The present invention solves these problems by providing a seal assembly including a resilient or elastomeric sealing ring which sealingly engages both of the relatively movable members when the seal assembly is exposed to a first pressure and which is forced out of sealing engagement with one of the relatively movable members in response to the application of higher pressures to the seal. This arrangement provides the advantages of having the resilient elastomeric sealing ring form a tight low-pressure seal between the relatively movable members and reducing wear on the elastomeric ring by urging the latter out of contact with one of the movable members when it is subjected to high pressure. The rate of wear on the elastomeric ring increases with an increase in the force holding the elastomeric ring in contact with the movable member. Thus, with the present invention, rubbing contact of the elastomeric ring with the movable member is avoided when wear on the elastomeric ring would be the greatest, i.e., at high pressures. The nonelastomeric sealing ring and the elastomeric sealing ring cooperate to provide a double seal at low pressure.

In order to assure that the elastomeric ring will move out of contact with one of the relatively movable members in response to relatively high fluid pressures, the elastomeric ring should not be placed in substantial tension. This means that the force for providing the low-pressure seal must be obtained at least in substantial part through radially squeezing the elastomeric ring. Furthermore, it is necessary to provide adequate unused volume within the seal groove into which at least some of the material of the elastomeric ring can be displaced when a high-pressure condition occurs. Finally, it is preferred to provide means at least partially within the seal groove for defining a face engaging the low-pressure side of the elastometric ring. To facilitate movement of the elastomeric ring in response to high pressure and to facilitate return of the elastomeric ring to a sealing position following the removal of the high pressure, this face is preferably inclined and extends away from the high-pressure side of the seal as it extends away from the member which does not have the seal groove therein.

By varying the factors set forth in the preceding paragraph as well as the material from which the elastomeric ring is constructed, the response of the elastomeric ring to a particular pressure condition can be varied. Thus, by appropriate selection of these parameters, the pressure at which the elastomeric ring moves out of contact with one of the relatively movable members can be varied.

Another very important function of the elastomeric sealing ring is to tightly urge the nonelastomeric sealing ring means into sealing engagement with both of the members. The force supplied by the elastomeric ring to the nonelastomeric ring means is a function of the squeezing force to which the cross section of the elastomeric sealing ring is subjected. The elastomeric sealing ring even under no fluid pressure is confined within the sealing groove so as to apply a force to the nonelastomeric sealing ring means. As pressure is applied to the seal assembly, the elastomeric sealing ring is squeezed further to hereby apply a force of greater magnitude to the nonelastomeric sealing ring means. When the pressure reaches sufficient magnitude so that the elastomeric sealing ring is urged out of engagement with one of the relatively movable members, the squeezing force supplied thereto is of sufficient magnitude so that the nonelastomeric sealing ring means can itself provide an effective seal.

For optimum results, the nonelastomeric sealing ring means preferably includes first and second nonelastomeric sealing rings. The first nonelastomeric sealing ring is engageable with the circumferential wall and one radial wall of the seal groove and the second nonelastomeric sealing ring is engageable with the elastomeric sealing ring and with the other of the relatively movable members. Each of the nonelastomeric sealing rings has a cam surface with the two cam surfaces being responsive to an axial force to urge the two nonelastomeric sealing rings against their respective sealing surfaces. The axial force is provided by the elastomeric sealing ring and by the fluid pressure acting against the elastomeric sealing ring. One advantage of the cam surfaces is that the nonelastomeric sealing rings are tightly urged into sealing engagement with their respective sealing surfaces on the two members.

The nonelastomeric sealing rings do not form a saddle or a full slipper seal effect for the elastomeric sealing ring. The second nonelastomeric sealing ring has an inclined face which is engaged by the elastomeric sealing ring. One function of the inclined face is to cause a component of the force supplied thereto by the elastomeric sealing ring to be directed radially toward said other member to urge that end of the sealing ring into tight sealing engagement with such other member. Another function of the inclined face is to cam the elastomeric ring out of contact with one of the relatively movable members in response to the application of higher fluid pressures.

One disadvantage of elastomeric sealing rings is that they are subject to chemical attack by certain corrosive fluids and they present problems when subjected to high temperatures. In order to obtain a good seal at both high and low pressures while adapting such seal for use in corrosive or high-temperature environments, the present invention teaches the use of a metallic resilient member for urging the first and second nonelastomeric sealing rings into sealing engagement with the surfaces of the relatively movable members. The metal member must apply sufficient force to the nonelastomeric sealing rings to permit them to form a tight seal and in addition, should be either, or both of, corrosion resistant and high-temperature resistant. By way of example, the metallic resilient member may be constructed of stainless steel.

BRIEF DESCRIPTION OF THE DRAWINGS

FIG. 4 is a fragmentary, axial sectional view of a second form of seal assembly installed in a seal groove and surrounding an inner member.

FIG. 5 is a fragmentary, axial sectional view similar to FIG. 4 illustrating a third form of the seal assembly.

FIG. 6 is a fragmentary perspective view of the expander ring used with the seal assembly of FIG. 5.

FIG. 7 is a fragmentary, axial sectional view similar to FIG. 4 illustrating a fourth form of the seal assembly.

FIG. 8 is a fragmentary perspective view of the expander ring used with the seal assembly of FIG. 7.

DESCRIPTION OF THE PREFERRED EMBODIMENTS

Figure 1:
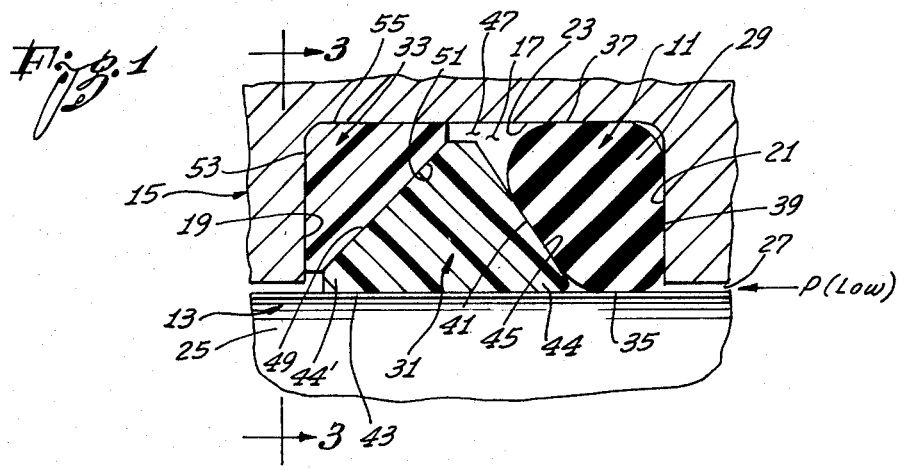
FIG. 1 is a fragmentary, axial sectional view of a seal assembly installed in a seal groove surrounding an inner member with low fluid pressures being applied to the seal assembly.

Referring to the drawings and in particular to FIG. 1 thereof, reference numeral 11 designates a seal assembly constructed in accordance with the teachings of this invention. The seal assembly 11, in the embodiment illustrated, is being utilized to form a seal between two movable members which are movable axially relative to each other. The members are in the form of a rod or inner member 13 and an outer member 15. The outer member 15 is formed with a seal groove or gland 17. It should be understood that the seal assembly 11 may be used between relatively movable members generally and is not restricted to use between relatively movable members of the type illustrated. Furthermore, the relative movement, if any, can be axial or rotational or both.

The outer member 15 has axially spaced radial walls 19 and 21 interconnected by a circumferential wall 23 with all of these walls defining the seal groove 17. The seal groove 17 opens at an outer peripheral surface 25 of the rod 13. Although the seal groove 17 is rectangular in axial cross section, it may have other shapes, if desired. The rod 13 and the outer member 15 are spaced slightly to define a circumferentially extending clearance space 27 which permits fluid under pressure to act on the seal assembly 11. The high- and low-pressure sides of the seal assembly 11 are on the right and on the left, respectively, as viewed on FIG. 1.

The seal assembly 11 includes resilient deformable ring 29 and nonelastomeric rings 31 and 33. The resilient ring 29 is preferably constructed of deformable elastomeric material such as rubber of the type which can form a good low-pressure seal. The ring 29 is generally annular and completely circumscribes the rod 13.

Figure 2:
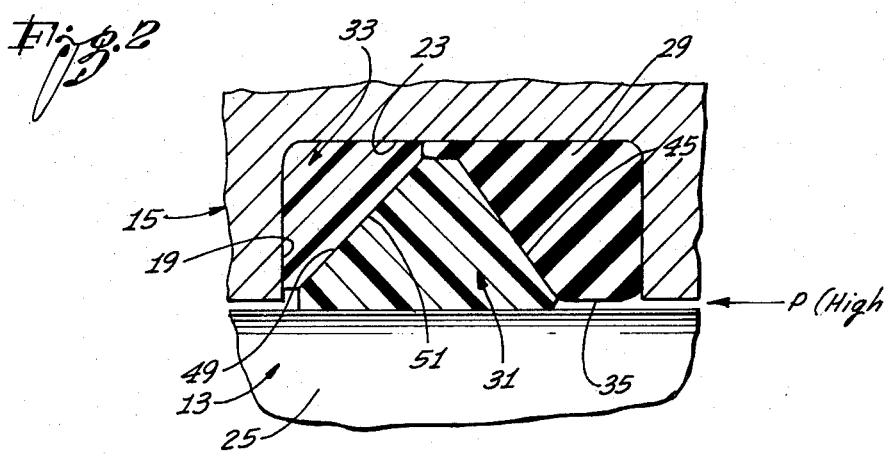
FIG. 2 is a fragmentary axial sectional view similar to FIG. 1 with the seal assembly being subjected to relatively high pressures.
Figure 3:
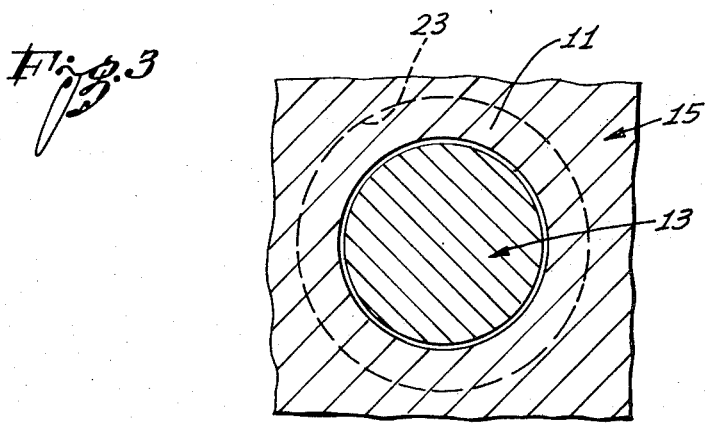
FIG. 3 is a fragmentary sectional view taken generally along line 3—3 of FIG. 1.

The ring 29 has an inner periphery 35 which sealingly engages the surface 25 when relatively low pressures are applied thereto and an outer periphery 37 which sealingly engages the circumferential wall 23. The ring 29 also has a radial surface 39 which sealingly engages the radial wall 21 and which faces the high-pressure side of the seal assembly 11. The ring 29 has an inclined radial surface 41 which faces the low-pressure side of the seal assembly 11. In the embodiment illustrated, the shape of the ring 29 in axial cross section is circular when the ring is unconfined. When the ring 29 is confined as shown in FIGS. 1 and 2, the cross section thereof is generally in the form of a trapezoid with the peripheries 35 and 37 forming the paralleled sides of the trapezoid. Of course different cross sections for the ring 29 can be used.

Preferably the tension or hoop stresses are minimized in the ring 29 when the latter is installed as shown in FIG. 1. The ring 29 is subjected to radial squeeze between the circumferential wall 23 and the surface 25 and also between the nonelastomeric ring 31 and the radial wall 21. This causes the ring 29 to sealingly engage the surface 25 as well as the walls 21 and 23 and the nonelastomeric ring 31.

The nonelastomeric rings 31 and 33 are formed from nonelastomeric material and at least the ring 31 should have a low coefficient of friction. The nonelastomeric material is preferably a deformable plastic which has good sealing qualities and which has a low coefficient of friction. A fluorocarbon such as polytetrafluorethylene is one such material. Both of the rings 31 and 33 are generally annular and completely circumscribe the rod 13. The rings 29, 31, and 33 are continuous and unsplit to provide a tight seal assembly.

The ring 31 is generally triangular in axial cross section and has an inner periphery 43 in the form of a cylindrical surface adapted to sealingly and slidingly engage the surface 25 of the rod 13. The ring 31 has a high-pressure end portion 44 and a low-pressure end portion 44'. The ring 31 has an inclined face 45 which engages the surface 41 of the ring 11 and which extends toward the low-pressure side of the seal assembly 11 as it extends radially away from the rod 13. The angle of the face 45 may vary; however, in the embodiment illustrated, it is between 50° and 60°.

The ring 31 has an outer periphery which is in radially spaced relationship to the circumferential wall 23. The rings 29, 31, and 33 and the circumferential surface 23 define a space 47. The ring 31 has a cam surface 49 which sealingly engages a mating cam surface 51 of the ring 33. As shown, both of these cam surfaces extend toward the high-pressure side of the seal as they extend radially away from the rod 13. The ring 33 has a radial surface 53 and a circumferential surface 55 which engage the walls 19 and 23, respectively, of the seal groove 17. The ring 33 does not engage the surface 25, and thus the rings 31 and 33 cooperate to span the radial gap between the surface 25 and the wall 23.

With the seal assembly 11 installed as shown in FIG. 1, the elastomeric ring 29 is radially compressed so that the inner periphery 35 thereof sealingly engages the surface 25. Similarly, the ring 29 sealingly engages the walls 21 and 23 and the inclined face 45 of the ring 31. Thus, under relatively low pressures the elastomeric ring 29 provides a very effective seal.

The radial compression of the elastomeric ring 29 results in the latter applying a force to the inclined face 45 of the ring 31. One component of this force is directed radially toward the rod 13 to thereby urge the high-pressure end portion 44 of the ring 31 into engagement with the surface 25. Another component of the force is directed axially and this causes the camming surfaces 49 and 51 to cooperate to urge the low-pressure end portion 44' of the ring 31 into engagement with the surface 25 of the rod 13 and the surfaces 53 and 55 into engagement with the walls 19 and 23, respectively, of the seal groove 17. It is particularly desirable to have the high-pressure end portion 44 in tight sealing engagement with the surface 25 to prevent leakage as a result of a fluid pressure wedge.

Under relatively low pressures, the sealing engagement between the nonelastomeric rings 31 and 33 and the surface 25 and the walls of the groove 17 is not ordinarily sufficient to provide an effective seal. With the present invention the low-pressure sealing function is performed by the elastomeric ring 29.

When relatively high fluid pressures are applied to the elastomeric ring 29 through the clearance space 27, such pressures urge the ring 29 out of contact with the surface 25 as shown in FIG. 2. Thus, as the pressure increases above a predetermined amount, the pressure is sufficient to urge the ring 29 upwardly along the inclined face 45 of the nonelastomeric ring 31. This causes the inner periphery 35 of the seal 29 to separate from the surface 25 and also displaces the material of the elastomeric ring 29 into the space 47. Thereafter, relative movement between the rod 13 and the outer member 15 will not result in any rubbing contact against the elastomeric ring 29 so long as relatively high fluid pressures are applied thereto.

Another effect of increasing the pressure of the fluid is that the compressive forces on the elastomeric ring 29 increase. This causes an increase in the force which is applied by the elastomeric ring 29 to the nonelastomeric rings 31 and 33 with the result that, prior to the time that the inner periphery 35 separates from the surface 25, the rings 31 and 33 are urged into tight sealing engagement with the contiguous surfaces of the members 13 and 15. Thus, the increase in fluid pressure causes the nonelastomeric ring 31 to sealingly engage the surface 25 and the surface 51, and the increased pressure causes the ring 33 to sealingly engage the walls 19 and 23 as well as the cam surface 49. Accordingly, prior to the time that the elastomeric ring 29 becomes ineffective as a seal, the nonelastomeric rings 31 and 33 have become effective to form a seal between the rod 13 and the outer member 15. Of course, the particular pressure at which the elastomeric ring 29 ceases to form an effective seal can be varied to suit particular requirements.

FIG. 4 shows a second embodiment of the invention in which corresponding parts are designated by corresponding reference characters followed by the letter *a*. FIG. 4 shows a seal assembly 11*a* in a seal groove 17*a* for forming a seal between a rod 13*a* and an outer member 15*a*. The rod 13*a*, the outer member 15*a*, and the seal groove 17*a* are identical to the corresponding elements shown in FIG. 1. Similarly, the nonelastomeric rings 31a and 33a are substantially identical to the rings 31 and 33, respectively, in all material respects.

The primary structural difference between the embodiments of FIGS. 1 and 4 is that the latter employs a coil spring 61 in lieu of the elastomeric ring 29. The coil spring 61 obviously has no sealing capability as it is formed in substantially conventional fashion from a helically wound wire or ribbon. Thus, the nonelastomeric rings 31a and 33a must form both the high-pressure and low-pressure seal. In order to accomplish this, it is important that the spring 61 apply sufficient force to the inclined face 45a of the ring 31a. The force applied to the inclined face 45a acts in the manner described in connection with the embodiment of FIG. 1 to provide a tight seal. Of course, the force applied to the ring 31a by the spring 61 is augmented by the fluid pressure acting on the rings 31a and 31b.

The spring 61 applies a force to the ring 31a by virtue of the fact that the spring 61 is in substantial tension when it is in the position shown in FIG. 4. As shown, the spring 61 is spaced from the surface 25a and except to the extent which it can actually move the ring 31a to the left, it cannot get closer to the surface 25a.

An advantage of the embodiment of FIG. 4 is that the spring 61 can be constructed of corrosion resistant and/or high-temperature resistant materials thereby adapting the seal assembly 11a for specialized service. By way of example, the coil spring 61 may be constructed of 300 series, 17–4 series, or 17–7 series stainless steel, all of which provide corrosion resistance. Alternatively, the spring 61 could be constructed of beryllium copper wire which affords substantial resistance to high temperatures. Thus, by eliminating the elastomeric ring 29 in favor of the resilient metallic spring 61, the seal assembly 11a can be adapted for specialized service.

The embodiment of FIG. 5 is identical to the embodiment of FIG. 4 except an expander 63 has been used in place of the coil spring 61. Portions of the embodiment FIG. 5 corresponding to portions of FIG. 4 are designated by corresponding reference characters followed by the letter b in lieu of the letter a. The expander 63 may be constructed of the same materials as the spring 61 and therefore the embodiment of FIG. 5 also possesses the advantages of specialized service application.

The expander 63 includes a circumferential flange 65 and a plurality of resilient fingers 67 interconnected by a web 69. The fingers 67 are separated circumferentially by notches 69.

The flange 65 abuts the radial wall 21b and the fingers 67 engage the inclined face 45b of the ring 31b. The fingers 67 are resilient and they apply a force to the inclined face 45b with the force extending generally perpendicular to the face 45b. This force produces the same results on the rings 31b and 33b as described hereinabove with reference to FIGS. 1 and 4. That is, the expander 63 being incapable of forming a low-pressure seal urges the nonelastomeric rings 31b and 33b into sealing engagement with each other and the contiguous surfaces for all fluid pressure ranges.

The embodiment of FIG. 7 is identical to the embodiment of FIG. 5 in every way except that an expander 73 has been substituted for the expander 63. Corresponding parts in FIG. 7 are designated by corresponding reference characters followed by the letter c in lieu of the letter b.

The expander 73 is similar to the expander 63 in that it includes a flange 75 and a plurality of fingers 77 interconnected by a web 79. The fingers 77 are spaced circumferentially by slots or notches 81. The expander 73 extends continuously and circumferentially of the rod 13c and completely surrounds the rod.

As shown in FIG. 7, the flange 75 and the web 79 engage the radial wall 21c and the circumferential wall 23c, respectively. The fingers 77 resiliently engage the inclined face 45c of the nonelastomeric ring 31c and apply a force thereto. The inclined face 45c and the camming surfaces 49c and 51c act as in the embodiments described above to cause the rings 31c and 33c to sealingly engage the contiguous surfaces of the members 13c and 15c regardless of the fluid pressure to which the seal assembly 11c is subjected.

Of course, the seal groove 17 in any of the embodiments of the invention can be formed in the rod 13 rather than in the outer member 15. With the seal groove 17 formed in the rod 13, the seal assembly 11 would be, in effect, turned inside out so that the inner peripheral surface 43 of the nonelastomeric ring 31 would be slidably engageable with the confronting surface of the outer member 15.

Although exemplary embodiments of the invention have been shown and described, many changes, modifications, and substitutions may be made by one having ordinary skill in the art without necessarily departing from the spirit and scope of this invention.

We claim:

1. A seal assembly comprising:

relatively movable inner and outer members, one of said members having two axially spaced radial walls and a circumferential wall defining a seal groove which is generally rectangular in axial cross section and the other of the members having a surface confronting the seal groove;

nonelastomeric sealing ring means in said seal groove and surrounding the inner member, said nonelastomeric sealing ring means being engageable with one of said radial walls and the surface of said other member;

an elastomeric sealing ring in said seal groove and surrounding the inner member, said nonelastomeric sealing ring means having a face confronting the elastomeric sealing ring, said elastomeric sealing ring being squeezed between said face of said nonelastomeric sealing ring and the other of said radial walls of said one member at least when no fluid pressure is applied thereto to thereby urge said nonelastomeric sealing ring into engagement with said one radial wall;

means defining void space in said seal groove contiguous said elastomeric sealing ring when no fluid pressure is applied to said elastomeric sealing ring;

means responsive to the force applied by said elastomeric sealing ring to said nonelastomeric sealing ring means to urge the nonelastomeric sealing ring means into engagement with said other member;

said elastomeric sealing ring sealingly engaging said other member at relatively low pressures to thereby provide a low-pressure seal, said elastomeric sealing ring being urged by higher fluid pressures out of sealing contact with said surface of said other member and into said void space to thereby prevent substantial rubbing contact between said elastomeric sealing ring and said surface of said other member and to radially compress said elastomeric sealing ring and cause said elastomeric sealing ring to urge the nonelastomeric sealing ring means into tight sealing engagement with said other member and said one radial wall to form a high-pressure seal; and said nonelastomeric sealing ring means including first and second nonelastomeric sealing rings, said first nonelastomeric sealing ring being sealingly engageable with said one radial wall and with said circumferential wall, said second nonelastomeric sealing ring having said face thereon and being sealingly engageable with said other member, said nonelastomeric sealing rings having cooperating cam surfaces responsive to the force applied to said face by said elastomeric sealing ring when the latter is subjected to high pressure to urge said first nonelastomeric sealing ring into fluidtight sealing engagement with said one radial wall and said circumferential wall and to urge said second nonelastomeric sealing ring into fluid tight sealing engagement with said other member.

2. A seal assembly as defined in claim 1 wherein each of said cam surfaces extends away from said other member as it extends away from said one radial wall.

3. A seal assembly as defined in claim 1 wherein said means responsive to the force applied by elastomeric sealing ring includes said face, said face being a cam face which extends axially toward said one radial wall as it extends away from said other member whereby said cam face and said cam surfaces cooperate to urge spaced portions of said second nonelastomeric sealing ring into fluidtight sealing engagement with said other member.

* * * * *